United States Patent [19]
Grady

[11] Patent Number: 5,848,476
[45] Date of Patent: Dec. 15, 1998

[54] MANUAL CLAMPING DEVICE FOR MEASURING RAILWAY TRACK ALIGNMENT AND PROFILE

[76] Inventor: Joseph R. Grady, 1612 Kinnard Dr., Franklin, Tenn. 37064

[21] Appl. No.: 717,351

[22] Filed: Sep. 20, 1996

[51] Int. Cl.⁶ ..................................................... G01B 5/20
[52] U.S. Cl. ................................ 33/1 Q; 33/287; 33/339; 33/413
[58] Field of Search ............................ 33/1 Q, 287, 338, 33/339, 413

[56] References Cited

U.S. PATENT DOCUMENTS

| | | | |
|---|---|---|---|
| 783,284 | 2/1905 | Kincaid | 33/413 |
| 1,417,703 | 5/1922 | Waffenschmidt | 33/1 Q |
| 1,531,652 | 3/1925 | Guillet | 33/413 |
| 1,927,178 | 9/1933 | Lemaire | 33/287 |
| 3,153,389 | 10/1964 | Plasser et al. | 33/413 |
| 4,916,823 | 4/1990 | Kunze | 33/413 |

FOREIGN PATENT DOCUMENTS

| | | | |
|---|---|---|---|
| 997633 | 1/1952 | France | 33/1 Q |
| 450813 | 10/1927 | Germany | 33/338 |
| 610766 | 3/1935 | Germany | 33/1 Q |
| 806146 | 6/1951 | Germany | 33/1 Q |

OTHER PUBLICATIONS

Unknown, Basic Paddles Photograph.
Stringliner—Rail Curve Measuring Tool—Brochure.
Unknown, Magnets/Cord Device.

*Primary Examiner*—Thomas B. Will

[57] ABSTRACT

A manual apparatus for facilitating railway track alignment and/or track profile measurements. The tool consists of two fastening units, each having a cord positioner designed to engage the rail head and to properly place a cord for measuring, a reel for storing and using the cord, and a direct reading ruler for measuring profile and alignment. Wherein, this manual tool can be used by a single person to quickly, effectively and accurately measure track profile and/or track alignment deviations.

2 Claims, 3 Drawing Sheets

MANUAL CLAMPING DEVICE FOR MEASURING RAILWAY TRACK ALIGNMENT AND PROFILE

BACKGROUND—FIELD OF INVENTION

This invention relates to a manual device for measuring railway track alignment and profile.

BACKGROUND—DESCRIPTION OF PRIOR ART

Railway companies are required to keep their track structures maintained to minimum safety standards with regard to track geometry. Two of these geometric standards are determined by measuring at the midpoint of a 62 foot cord, more specifically, track alignment and profile. There is outlined in the United States of America—Department of Transportation—Federal Railroad Administration Title 49 Part 213 (Track Safety Standards) both the alignment and profile deviations that are allowable for specified train speeds. Part 213.55 describes the standards for Alignment. Part 213.63 describes the standards for profile (see article 1 enclosed—Track Safety Standards ). These measurements are most commonly used by federal, state, and railway company inspectors. The measurements are also used by track engineers and track constructors.

There have been many technological advancements in production type vehicles for track geometry measurements, such as electronic and laser measuring equipment. The advancement in manual use has been limited, particularly for single person operation. It is often needed for a single person inspecting track to measure an alignment or profile deviation. This is necessary to determine if the track is safe for trains at the present operating speeds. Therefore, a single person needs an effective instrument to accomplish it.

Of these instruments available today, the most common is two paddle like handles used with a 62 foot cord attached at each end. The cord is simply hand wound around one of the paddles. This requires three persons to measure, one holding each paddle and one to take the measurement at the midpoint.

A second known prior art instrument uses paddles similar to the first mentioned prior art instrument and has a separated reel. The paddles have a threaded bolt whereby one person must hand screw both bolts to fastened and unfasten it to and from the rail. The tool is not a single unit, the reel not conveniently being a part of the fastening paddle. It is time consuming to fasten and unfasten it to the rail. It takes considerably more time for one person to measure alignment than to perform the same measurements with my single unit quick clamping invention.

A third known prior art instrument is composed of two magnets with a cord attached to each magnet. The cord in this case is hand wound around the magnets for storage. This instrument is very time consuming for one person as they must unwind and rewind the cord each time it is used or drag it between measurements.

In all the above cases, the instruments do not have the design capability of performing profile measurements. The attempt of using two wooden blocks of equal height has been tried to support a line above the rail to perform profile measurements. This method must have a very tight, non sagging line. In the past, it has not been accepted by many as being accurate. The method of using a tripod and level is accepted.

However, even with all the above known means, there has been, until this invention, a significant problem. There has not been a tool which can be carried by an individual track inspector to quickly and accurately measure both track alignment and track profile deviations.

Thus, there is a great safety need for an individual track inspector to carry a small, lightweight, effective and accurate tool of this kind. With this invention, the strong fastening unit is designed to engage the rail head with superior clamping strength for measuring both track alignment and track profile.

OBJECTS AND ADVANTAGES

Accordingly, several objects and advantages of this invention are:

a) to provide a manual means for a single person to more quickly, easily and accurately perform measuring of alignment and profile on railway track;

b) to provide a quick, strong clamping device which combines a commercial clamp with a cord positioner, the clamp provides the squeezing strength while the cord positioner provides the resistance to the rotating moment of the clamping device;

c) a reel affixed to one of the clamps allows for dispensing and quick rolling up of the cord. It provides a cord made of Kevlar for alleviating any significant sag;

d) to provide a user friendly, direct measuring system for both profile and alignment through use of a special double sided stainless steel ruler;

e) to provide a fast process to change the unreeled length of cord from profile measuring to alignment measuring and still maintain the actual 62 feet 0 inches needed for proper measuring;

f) to provide a quick and effective instrument that will measure both track alignment and track profile;

g) to provide the user with a faster, easier and more accurate way of determining the track safety compliance conditions for both our freight and passenger railway systems and therefore providing for a safer railway system.

DESCRIPTION—FIG. 1

Figure 1:
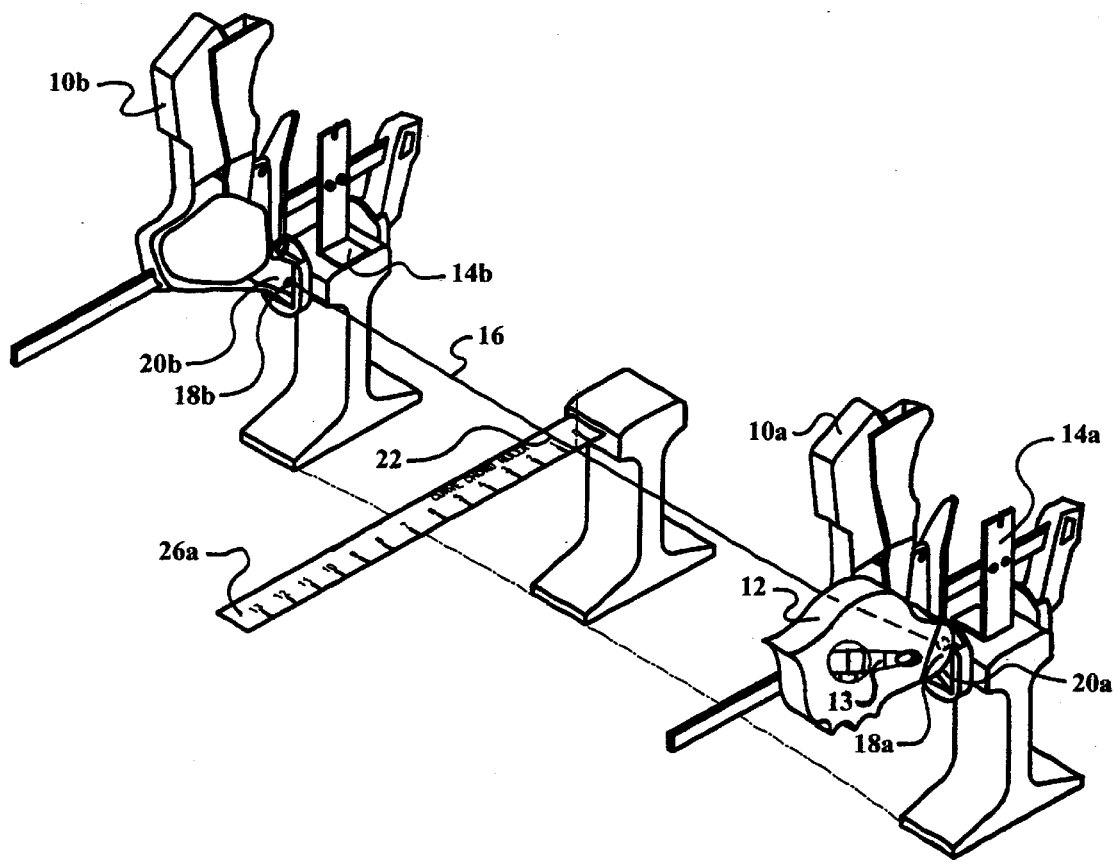
FIG. 1 shows the clamping device setup to measure track alignment

FIG. 1 shows a perspective view of the measuring tool set up to measure alignment of track. The tool consists of two commercial clamps 10a and 10b with a reel 12 affixed to clamp 10a. Each clamp has a cord positioner 14a and 14b fastened to it. A cord 16 from reel 12 feeds through a small hole 18a on an inside clamp leg 20a and is fastened to the inside clamp leg 20b at hole 18b of clamp 10b. The cord 16 is controlled by reel handle 13. The bottom of the cord positioners 14a and 14b (where it contacts the rail head and provides the resistance to the rotating moment created by the cord tension about the clamping devices) is vertically ⅝ inch above the holes 18a and 18b. The reel 12 provides 62 feet 0 inches of cord 16 between clamps 10a and 10b. The cord 16 has two red marks 22 on it at a point 31 feet from each of the inside clamp legs 20a and 20b. Two red marks 22 indicate the midpoint of the cord during alignment measurements. A ruler 26a displays it's alignment side.

DESCRIPTION—FIG. 2

Figure 2:
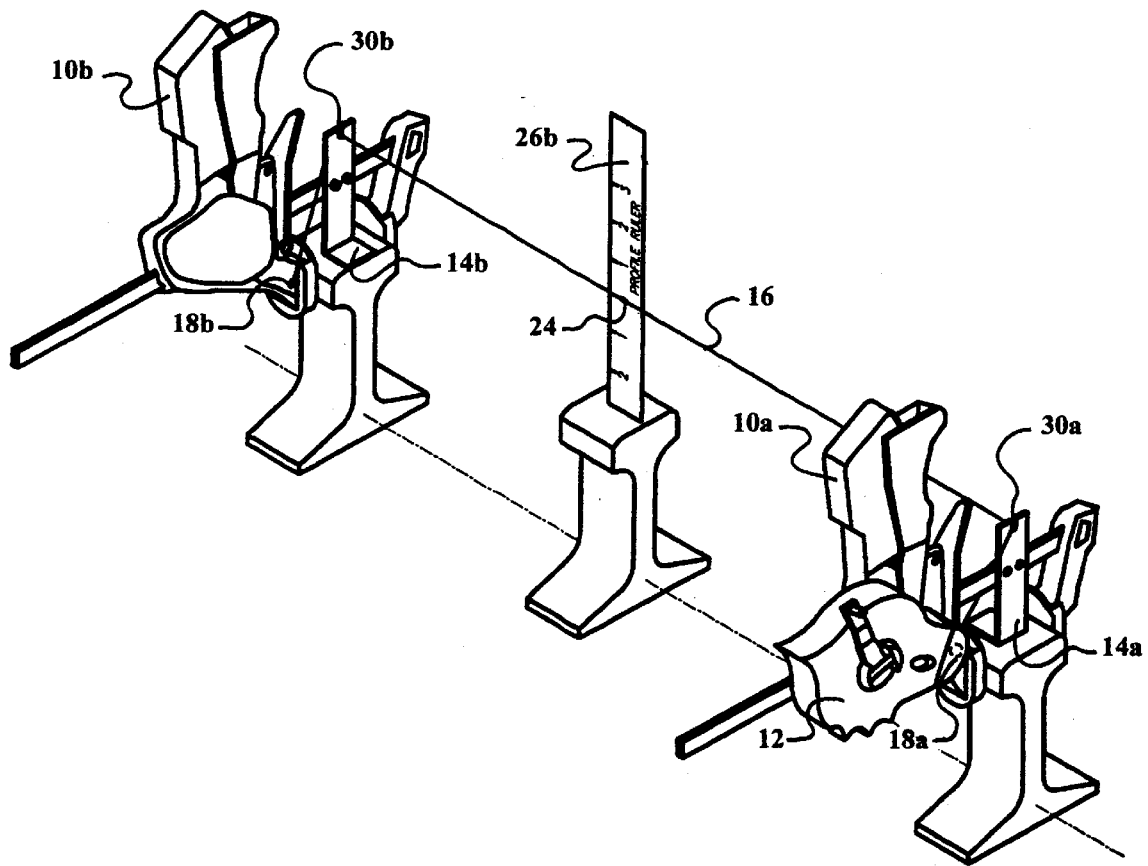
FIG. 2 shows the clamping device setup to measure track profile

FIG. 2 shows a perspective view of the exact same tool as described above in FIG. 1, but is shown measuring profile of track.

Differently, the cord 16 travels from the holes 18a and 18b to the cord guides 30a and 30b which places the cord 3 inches above the top of the rail head at the clamp 10a and 10b locations. The cord 16 has two blue marks 24 on it at a point 31 feet from each of the cord positioner 14a and 14b. The two blue marks 24 indicate the midpoint of the cord 16 during profile measurements. The ruler 26b displays it's profile side.

DESCRIPTION—FIG. 3

Figure 3:
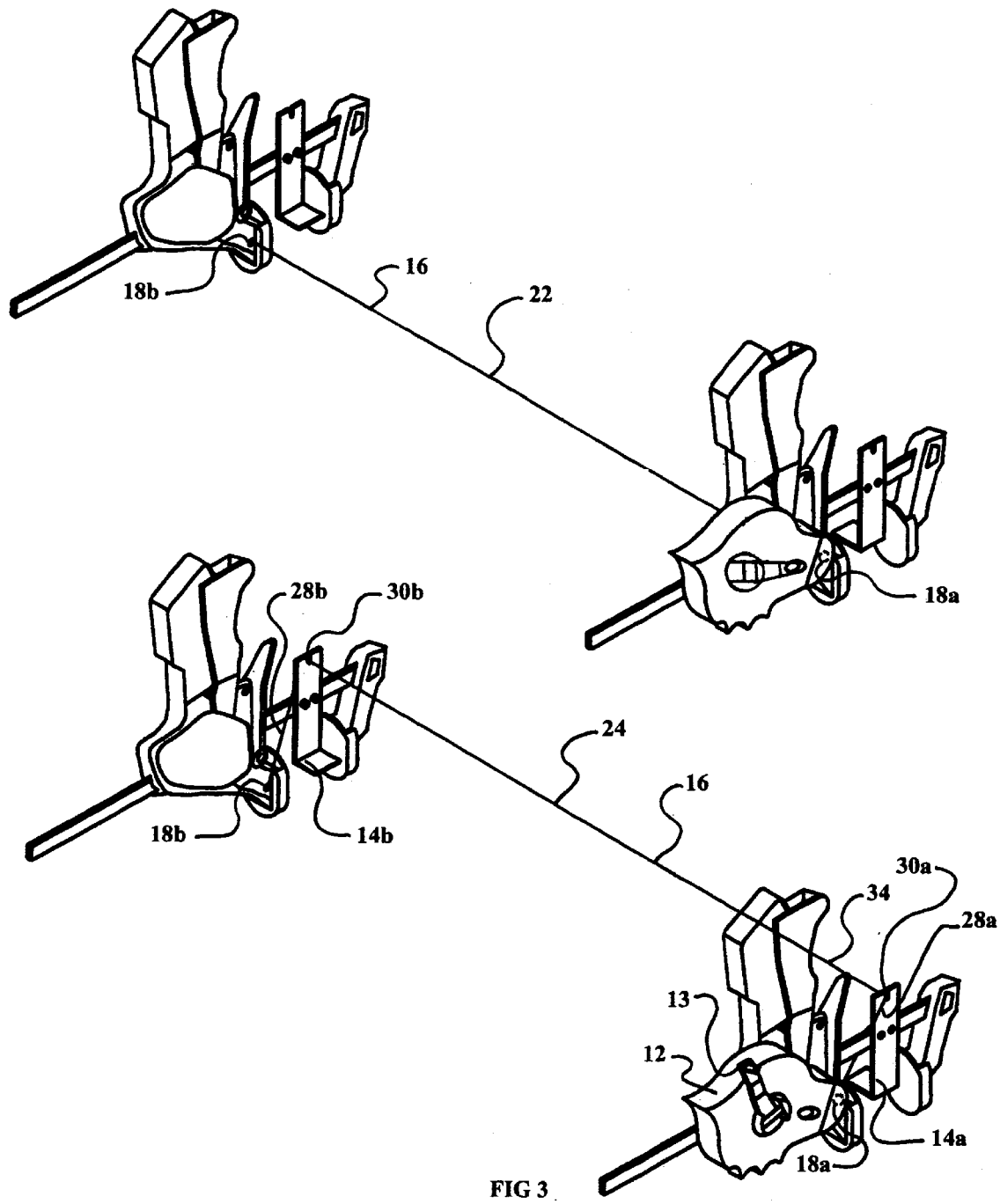
FIG. 3 shows the relationship between the two unreeled cord lengths in order to display the process used to accomplish the change in the working cord lengths.

FIG. 3 shows a perspective view of the clamping device shown for both the alignment and profile setups. An interrelation between a cord length 16, cord lengths 28a and 28b, the cord positioners 14a and 14b, the two red marks 22, the two blue marks 24, a single red mark 34, the reel 12 and the reel handle 13 will be explained in the operation—FIG. 3. This relation will allow for the alignment and profile setups to maintain the 62 feet 0 inches measuring length.

OPERATION—FIG. 1 Alignment

A single alignment measurement is taken by unlocking the reel handle 13 and taking the clamp 10b in ones left hand and clamp 10a in the right. Fasten clamp 10b to the rail. Walk away with clamp 10a in one hand until the entire length of cord 16 empties from reel 12. Turn reel handle 13 four and one half revolutions then place it in the locked position. This provides the 62 feet 0 inches length and is verified when the single red mark on the cord is located at hole 18a. Take clamp 10a and pull the cord slightly taut. Stretch the cord 2 inches and fasten clamp 10a to the rail. The cord 16 is set in place by the cord positioners 14a and 14b with its ends being ⅝ inch below the top of the rail head (as required in Title 49 Part 213.55). The cord 16 ends are offset ½ inch horizontally away from the rail. The ruler side 26a begins with 0 inches at a distance ½ inch from the end of the ruler to compensate for the horizontal offset. To take the alignment measurement one simply finds the midpoint (two red marks 22). Take the ruler side 26a horizontally and facing up. Take the 0 inch end and place it under cord 16 and against the rail head at a point ⅝ below the top of the rail. Looking down vertically read the measurement at the midpoint. To stop the measurement, release the clamp 10a, reel in the cord 16 and release clamp 10b.

OPERATION—FIG. 2 PROFILE

A single profile measurement is taken by unlocking the reel handle and taking the clamp 10b in ones left hand and clamp 10a in the right. Fasten clamp 10b to the rail. Then lift the cord 16 behind, over the top and down into the cord guide 30b. Walk away with clamp 10a in one hand until entire length of cord 16 empties from reel 12. Then lift the cord 16 behind, over the top and down into the cord guide 30a. This will provide the 62 feet 0 inches required. Take clamp 10a and pull the cord slightly taut. Stretch the cord 2 inches and fasten clamp 10a to the rail. The cord 16 is now in place with its ends being 3 inches above the top of the rail head (3 inches is the maximum allowable profile deviation for the slowest track speed). To take the profile measurement one simply finds the midpoint of the cord 16 (two blue marks 24). Take the ruler side 26b vertically and place on top of the rail head behind the cord 16. The ruler side 26b has its "0" inch mark 3 inches from the end and is graduated in each direction away from 0, providing for a direct measurement of both crest and dip profile conditions. To stop the measurement, release the clamp 10a, reel in the cord 16 and release clamp 10b.

OPERATION—FIG. 3

Process of Changing Cord Length and Maintaining 62 feet 0 inches for both Alignment and Profile Setups As previously conveyed, the cord length 16 needed to measure both profile and alignment is 62 feet 0 inches. In the profile setup (bottom), the cord length 16 lies between the cord guides 30a and 30b which is 62 feet 0 inches. The midpoint is at the two blue marks 24, which are 31 feet each way from the cord guides 30a and 30b. The cord lengths 28a and 28b are equal to the distance from holes 18a and 18b to the cord guides 30a and 30b, respectively. The entire length of cord unreeled during profile measurements is cord length 16 plus cord lengths 28a and 28b. (We will not consider the length from the reel 12 to the hole 18a, as it stays constant and does not effect the change process).

In the alignment setup (top), the cord length 16 lies between the holes 18a and 18b. The midpoint is at the two red marks 22 which are 31 feet from the holes 18a and 18b.

Therefore, to change from the profile measuring setup to the alignment setup, it is necessary to reduce the profile unreeled length by length 28a plus 28b. Four and one half times the circumference of the drum inside the reel 12 is equal to the sum of cord lengths 28a and 28b. This design allows a person to change from profile to alignment measuring by turning the reel handle four and one half times and locking the handle. For user verification of proper alignment cord length, a single red mark 34 will appear at the hole 18a to assure proper cord length 16 during alignment measurements.

SUMMARY, RAMIFICATIONS, SCOPE

As outlined, this manual clamping device for measuring railway track alignment and profile is a fast, practical, accurate and convenient railway tool. It's primary use is for track inspectors to determine the safe speeds of trains. This instrument combines two fastening units, a reel, a cord and ruler. It implements a part relationship which is designed to measure both track alignment and profile.

This clamping device has the advantage over any prior art by it's manual capability for one person to quickly, effectively and accurately measure both railway track profile and track alignment deviations. It also has the advantage of its special combination of parts being combined into a single unit for measuring convenience. The included designed process of quickly converting its 62 feet cord from profile to alignment (or vise versa) gives further advantage for quick accurate measuring.

Because of its facility of use, which also enhances accurate measurements and reduces errors, this instrument will permit more measurements, with greater ease and accuracy, by fewer personnel. In short, this invention is a user friendly instrument which allows railway inspectors to more effectively determine the safety of our railway system.

Although the description above contains many specificities, these should not be construed as limiting the scope of the invention but as merely providing the design of parts and processes to create the invention. For example the reel or clamp could be of a different type; the cord positioner s could have a different height, etc.

I claim:

1. A manual apparatus for facilitating railway track alignment and/or track profile measurements, the apparatus comprising:
   a) a right fastening unit comprising:
      (i) a right clamp having a guiding member on which two padded legs are mounted, a right cord positioner rigidly fastened to said guiding member located to allow said two padded legs in combination with said right cord positioner to engage a rail head so as to resist a rotational moment about said right clamp;
      (ii) a reel connected to said right clamp for storing and playing out a cord, including a means for holding said cord to a predetermined extension;
   b) a left fastening unit comprising:
      (i) a left clamp having a guiding member on which two padded legs are mounted, a left cord positioner rigidly fastened to said guiding member located to allow said padded legs in combination with said left cord positioner to engage a rail head so as to resist a rotational moment about said left clamp;
      (ii) means for connecting the opposite end of said cord;
   c) a direct reading ruler for measuring both alignment and profile, wherein, the design of said right cord positioner and said left cord positioner provide for resisting the rotational moments created by said cord tension which will allow said left and said right fastening units to provide for an effective engagement of a rail head.

2. The apparatus in claim 1 wherein said left cord positioner and said right cord positioner each includes a resistance means to resist the rotational moment created by said cord and a guide means to vertically place the cord for profile measurements.

* * * * *